Patented July 30, 1929.

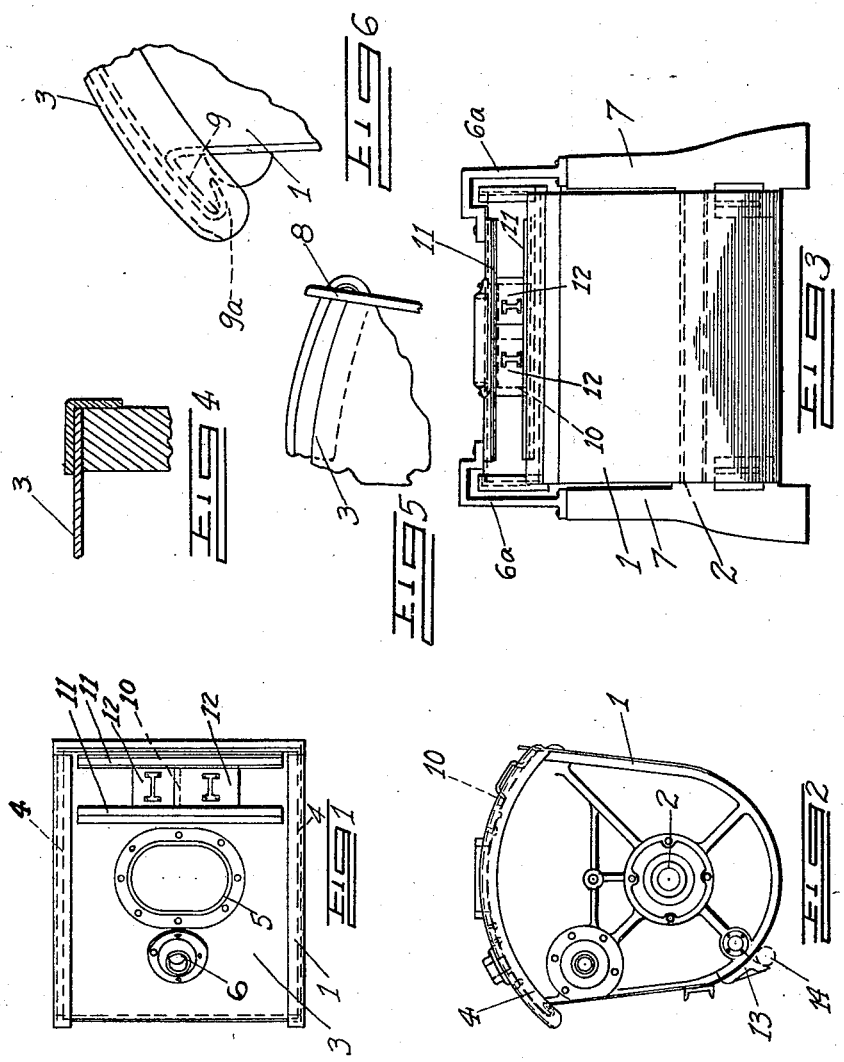

1,722,475

UNITED STATES PATENT OFFICE.

FRANK X. LAUTERBUR AND EDWARD J. LAUTERBUR, OF SIDNEY, OHIO.

DOUGH MIXER.

Application filed June 30, 1926. Serial No. 119,705.

Our invention relates to dough mixers, and more particularly to the lids used therefor.

In the past it has been proposed to form a lid for a dough mixer, which is curved to conform to the top of the mixer bowl, and is held in fixed position when required, by suitable standards so that the bowl can be rocked out from under the lid, thus exposing the contents of the mixer.

Our invention relates to lids of this general type, and our improvements consist in making the lids completely sealed to the top of the mixing bowl, when mixing is being carried on, while by the provision of suitable elements in the lid itself, the dough materials and water can be introduced into the bowl, and the contents of the bowl can be inspected at any time without rocking the bowl or lifting any part of the lid plate away from the bowl.

We accomplish our objects by that certain construction and arrangement of parts of which a single typical example will be described in detail, and those novel elements of which will be set forth in the appended claims.

In the drawings:—

Figure 1 is a plan view of the device.

Figure 2 is an end elevation thereof.

Figure 3 is a front elevation thereof.

Figure 4, showing the supporting standards, is a detail showing the lateral track for the lid.

Figure 5 is a detail showing the front wall abutment.

Figure 6 is a detail of the rear wall interlock.

We have shown more or less diagrammatically, the standards for the bowl, and suitable portions thereof to which the lid may be permanently secured in Figure 3. The bowl 1, is supported on centers 2, and is rocked by suitable mechanism on those centers. The tops of the side walls of the bowl are curved, as indicated, on a curve which is centered on the centers 2, so that the lid, which is formed of a plate 3, can be curved to conform to a like arc, and can rest on the bowl while it is being rocked on its centers.

It is essential to our invention that the lid be held down to the bowl along the sides thereof, to provide a seal at this point. As a simple method of accomplishing this, we provide the top edges of the side walls with an angle iron 4, conforming in its arc of bend to the bowl walls, and forming a space along the top of the walls in which the projecting lateral edges of the lid are inserted, guided and held.

It will be evident that with such an arrangement, no part of the lid can be hinged so that it may be lifted up while the bowl is in its vertical or operating position as shown in the drawings.

Thus, in order to permit the insertion of materials, we provide a top opening at 5 for introduction of flour and various ingredients, and a pipe opening at 6 for the introduction of liquids. The two separate openings are needed, because the opening 5 will normally be held in position to receive material from a hopper, above the bowl, such as depends from a flour sifter.

The lid is held in position by means of a suitable engagement, indicated by the brackets 6$^a$, with the standards 7, 7, on which standards the bowl can swing, while the lid is held in one position.

In order to seal the front end of the lid, the plate forming the inside front wall of the bowl is brought upwardly beyond the mouth of the bowl as at 8, so as to lie across the end of the bowl and form an abutment for the lid plate.

In order to seal the back end, the plate forming the back wall of the bowl is bent outwardly as at 9, and the lid plate is formed with a body which curves downwardly as at 9$^a$, so as to hook behind the inwardly bent portion 9. In Figure 6, the structure is obscured by the side wall of the track forming angle iron at the top of the bowl, and is therefore, shown in dotted lines. The interlocking parts 9 and 9$^a$ preferably extend clear across the top edge of the bowl and the lid.

In order to permit view of the contents of the bowl, an opening is formed near the front of the lid indicated at 10, and channel plates 11 are secured to the lid running along-side of this hole. Covers or shutters 12, 12, engage between the lid plate and the top flange of the plates 11, which covers can be slid to a position of opening and closing the hole 10. As so constructed, it will be evident that the bowl and lid are sealed clear along the sides and at the front and back, when the bowl is in vertical position. To assure a proper registery without strain on the lid, an abutment, as indicated in Figure 2, is placed at 13 on the bowl which engages a cross bar 14 on the frame of the machine.

The bowl is set vertically when being filled through the hopper opening and pipe opening, subject to inspection through the sliding covers. When the device is in operation, there is no place for the material to be flung out, and leak over the sides of the structure. Inspection is still possible because of the sliding covers to the inspection hole.

There are no doubt other expedients by means of which the same mechanical function can be accomplished as by those particular devices shown, and we wish to be entitled to the use of the doctrine of equivalents in the construction of our claims that follow.

Having thus described our invention what we claim as new and desire to secure by Letters Patent is:—

1. In a dough mixer having a curved top, a lid curved to conform to the top, and normally held in fixed position while the bowl may rock beneath it, flanges arranged along the top edges of the side walls of the bowl, between which flanges and the walls of the bowl the lid is slidingly held, an abutment on the bowl at the front for engagement with the lid when the bowl is in position directly beneath the lid, and an abutment on the lid to engage the bowl along the back upper edge thereof, when the bowl is in said position, said abutment last noted, being formed as a hook portion extending across the back edge of the lid, and said bowl having a laterally extending flange to be engaged by said hook portion.

2. In a dough mixer having a curved top, a lip curved to conform to the top, and normally held in fixed position while the bowl may rock beneath it, flanges arranged along the top edges of the side walls of the bowl, between which flanges and the walls of the bowl the lid is slidingly held, an abutment on the bowl at the front for engagement with the lid when the bowl is in position directly beneath the lid, and an abutment on the lid to engage the bowl along the back upper edge thereof, when the bowl is in said position, said abutment last noted being formed as a hook portion extending across the back edge of the lid, and said bowl having a laterally extending flange to be engaged by said hook portion, and an auxiliary stop for determining the operating position of the bowl.

3. In a dough mixer having a rocking bowl with a curved top, and a fixedly mounted lid contoured to fit the curve of the top, means for limiting the movement of the bowl from tilted position to operating position, comprising the combination of a front abutment extending upwardly from the bowl adapted to engage the cover and a rear interlock comprising a hooked portion extending downwardly from the cover, with a flanged portion extending outwardly from the bowl adapted to engage the hooked portion.

4. In a dough mixer having a rocking bowl with a curved top, and a fixedly mounted lid contoured to fit the curve of the top, means for controlling the movement of the bowl from tilted position to operating position, comprising the combination of a front abutment extending upwardly from the bowl adapted to engage the cover and a rear interlock comprising a hooked portion extending downwardly from the cover, with a flanged portion extending outwardly from the bowl adapted to engage the hooked portion, and a hooked shaped arm carried by the bowl adapted to engage a blocking rod.

FRANK X. LAUTERBUR.
EDWARD J. LAUTERBUR.